United States Patent
Neet et al.

(10) Patent No.: US 6,787,961 B2
(45) Date of Patent: Sep. 7, 2004

(54) AUTOMOTIVE ALTERNATOR STATOR ASSEMBLY WITH VARYING END LOOP HEIGHT BETWEEN LAYERS

(75) Inventors: Kirk E. Neet, Saline, MI (US); Steven J. Yockey, Ypsilanti, MI (US); Eric D. Bramson, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/324,319

(22) Filed: Dec. 19, 2002

(65) Prior Publication Data

US 2004/0119361 A1 Jun. 24, 2004

(51) Int. Cl.$^7$ .............................................. H02K 17/00
(52) U.S. Cl. ...................... 310/201; 310/260; 310/208
(58) Field of Search ................................ 310/201, 208, 310/260, 179, 180, 195

(56) References Cited

U.S. PATENT DOCUMENTS

| | | | |
|---|---|---|---|
| 3,321,653 A | * 5/1967 | Sonoyama | 310/180 |
| 3,324,322 A | * 6/1967 | Johns | 310/198 |
| 5,955,810 A | * 9/1999 | Umeda et al. | 310/208 |
| 6,201,332 B1 | * 3/2001 | Umeda et al. | 310/184 |
| 6,268,678 B1 | 7/2001 | Asao et al. | 310/201 |
| 6,501,205 B1 | * 12/2002 | Asao et al. | 310/184 |
| 2001/0019234 A1 | 9/2001 | Murakami et al. | 320/180 |
| 2001/0020807 A1 | 9/2001 | Imori et al. | 310/254 |

* cited by examiner

*Primary Examiner*—Dang Le
(74) *Attorney, Agent, or Firm*—Brinks Hofer Gilson & Lione

(57) ABSTRACT

A stator core assembly having an annular core defining an outside diameter, an inside diameter, and a plurality of radially projecting winding slots. A first electrical conductor and a second continuous electrical conductor are inserted within the winding slots circumferentially around the stator core. The conductors form a plurality of layers, each layer being defined as one substantially complete circumferential pass of the conductors around the stator core. Each of the conductors include a plurality of straight portions that lay within the winding slots, and a plurality of end loop portions that extend circumferentially to connect two of the straight portions. The length of the straight portions and end loop portions vary between the layers based upon the radial location of the particular layer within the stator core and a pre-determined axial height of the end loop portions.

27 Claims, 10 Drawing Sheets

AUTOMOTIVE ALTERNATOR STATOR ASSEMBLY WITH VARYING END LOOP HEIGHT BETWEEN LAYERS

FIELD OF INVENTION

The invention relates to an automotive electrical alternator, and particularly to an alternator having a stator winding configuration having end loops with varying axial heights.

BACKGROUND OF THE INVENTION

This invention is related to an electrical alternator, of a type particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; and increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

Enhanced efficiency of the alternator can be provided through various design approaches. The alternator uses a rotating rotor assembly, which creates a rotating alternating polarity magnetic field. This rotating alternating polarity magnetic field is exposed to an annular stator core assembly which closely surrounds the rotor assembly. Electrical conductor windings are embedded within the stator core assembly. A number of design challenges are presented with respect to the design and manufacturing of the stator core assembly which includes a stator core and the windings. The stator core has a series of radially projecting slots. Some alternator designs employ conventional wire conductors having a round cross sectional shape laced into the stator core winding slots. These round cross-sectional wires are nested against other turns of wire in the slots. The use of such round wire produces air spaces between adjacent turns of wire. This air space represents unused space in the cross section of the stator core. Electrical resistance through a solid conductor is related to its cross sectional area. Consequently, the air space between adjacent turns of a round wire stator represents inefficiency since that space is not being used to carry electrical current through the stator windings.

One improved design of stator core assembly uses stator windings formed of rectangular or square cross sectional wire. Such wire can be laced into the stator core winding slots in a very densely packed configuration. This allows larger cross sectional areas to be provided for the conductors, thus lowering the conductor's resistance. Reducing the stator core winding resistance improves efficiency. Such rectangular wire core designs are said to improve "slot space utilization".

Although rectangular cross section wire for the stator core assembly provides the previously noted benefits, its use produces a number of design challenges. Rectangular cross section wire is more difficult to form and wind into the stator winding slots, since it is necessary to align the cross section to the slot dimensions.

Since the stator conductors are laced from the two axial ends of the stator core, they are looped at their ends to pass into the next appropriate winding slot. It is desirable to reduce the length or height of these end loops as a means of reducing the total length and therefore the internal resistance of the conductors.

Designers of stator assemblies further attempt to reduce or eliminate the need for providing electrical conductor terminations and connections in the stator assembly. The necessity to physically connect conductors in the stator core assembly adversely impacts cost and complexity of the manufacturing process. An advantageous design of an alternator stator assembly would enable the stator assembly to be readily adapted for various types of electrical connections and number of phases of produced alternating current. Automotive electrical alternators are often manufactured in a three-phase configuration with the phases connected in the familiar delta or wye connections. As mentioned previously, the alternating current output is later rectified and conditioned by downstream electrical devices.

A particular technique of winding the continuous conductors onto the stator core that improves many of the conditions discussed above is disclosed in U.S. patent application Ser. No. 10/056,890 filed on Jan. 24, 2002, entitled "Automobile Alternator Stator Assembly With Rectangular Continuous Wire", and Continuation In Part application Ser. No. 10/265,529 filed on Oct. 8, 2002, entitled "Automobile Alternator Stator Assembly With Rectangular Continuous Wire". These two patent applications disclose a particular method of winding continuous rectangular conductors onto the stator core, are assigned to the assignee of the present application, and are hereby incorporated by reference into this application. The winding technique discussed in these applications results in end loops of the conductors being formed at opposing ends of the stator core. In some instances, it would be desirable to have the axial heights of the end loops constant for all the layers, and in other instances, it would be desirable to have varying axial heights of the end loops.

Therefore, there is a need for a stator core assembly having predetermined end loop heights that are controlled by the length of the end loop portion of the conductor and by the radial position within the stator core.

SUMMARY OF THE INVENTION

The automotive alternator stator core assembly in accordance with this invention addresses each of the design and manufacturing goals previously noted. The alternator stator core assembly in accordance with this invention utilizes a unique winding pattern particularly advantageously used with rectangular cross section stator winding conductors, as disclosed in U.S. patent application Ser. No. 10/056,890 filed on Jan. 24, 2002, entitled "Automobile Alternator Stator Assembly With Rectangular Continuous Wire", and Continuation In Part application Ser. No. 10/265,529, filed on Oct. 8, 2002, entitled "Automobile Alternator Stator Assembly With Rectangular Continuous Wire".

The design features high slot space utilization, eliminates the necessity for providing internal welds or other connections for the conductors, and end loop heights which can be constant over all layers, can increase from the outermost layers to the inner most layers, or can decrease from the outermost layers to the inner most layers.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
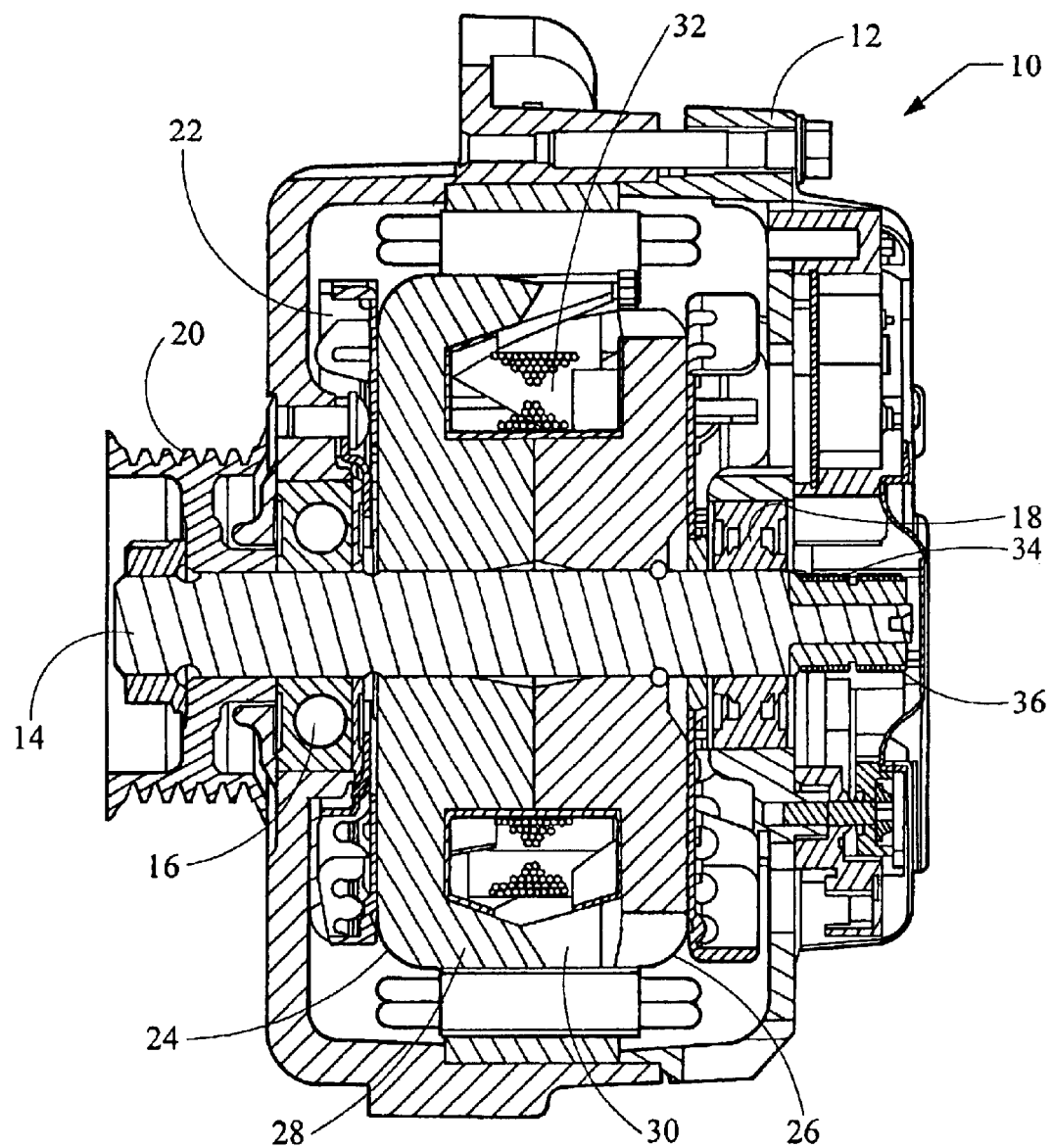
FIG. 1 is a cross sectional view of a typical prior art electrical alternator.

In order to provide a framework for a further detailed description of the preferred embodiments of this invention, FIG. 1 is presented illustrating a prior art electrical alternator configuration. FIG. 1 illustrates an electrical alternator 10 enclosed with a housing 12. An alternator rotor shaft 14 is supported by a pair of rolling element bearings 16, 18. A belt driven pulley 20 is fastened to the protruding front end of the rotor shaft 14. A fan 22 rotates with the shaft 14 and provides cooling airflow for removing heat from the alternator 10. Front and rear alternator poles pieces 24 and 26, respectively, rotate with the shaft 14 and have extending claw fingers 28 and 30, respectively. The fingers 28 and 30 interlace to create the well known "claw pole" rotor configuration. Although the "claw pole" rotor is described, one skilled in the art will recognize that the described stator design can be used in conjunction with other types of rotors, such as; permanent magnet non claw pole, permanent magnet claw pole, salient field wound and induction type rotors. An excitation winding 32 is carried within the cavity formed between pole pieces 24 and 26. A DC signal is applied to the excitation winding 32 through a pair of slip rings 34 and 36, and associated brushes.

Figure 2:
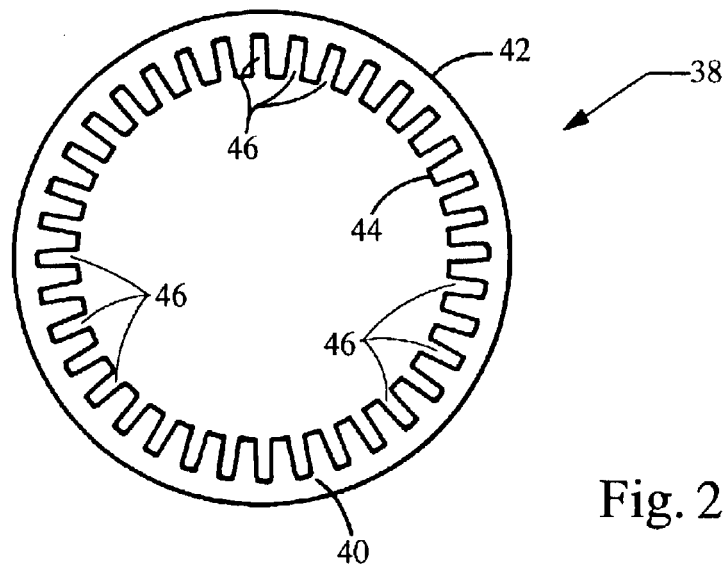
FIG. 2 is an end view of a stator core of the stator core assembly in accordance with this invention.

The present invention relates to a stator core assembly 38 for an electric machine of the type having a rotor assembly and a stator assembly. The stator core assembly 38 is of the type having at least one phase and having an annular core 40 defining an outside diameter 42, an inside diameter 44, and a plurality of radially projecting winding slots 46 opening to the inside diameter 44 but terminating short of the outside diameter 42, as shown in FIG. 2.

Figure 3:
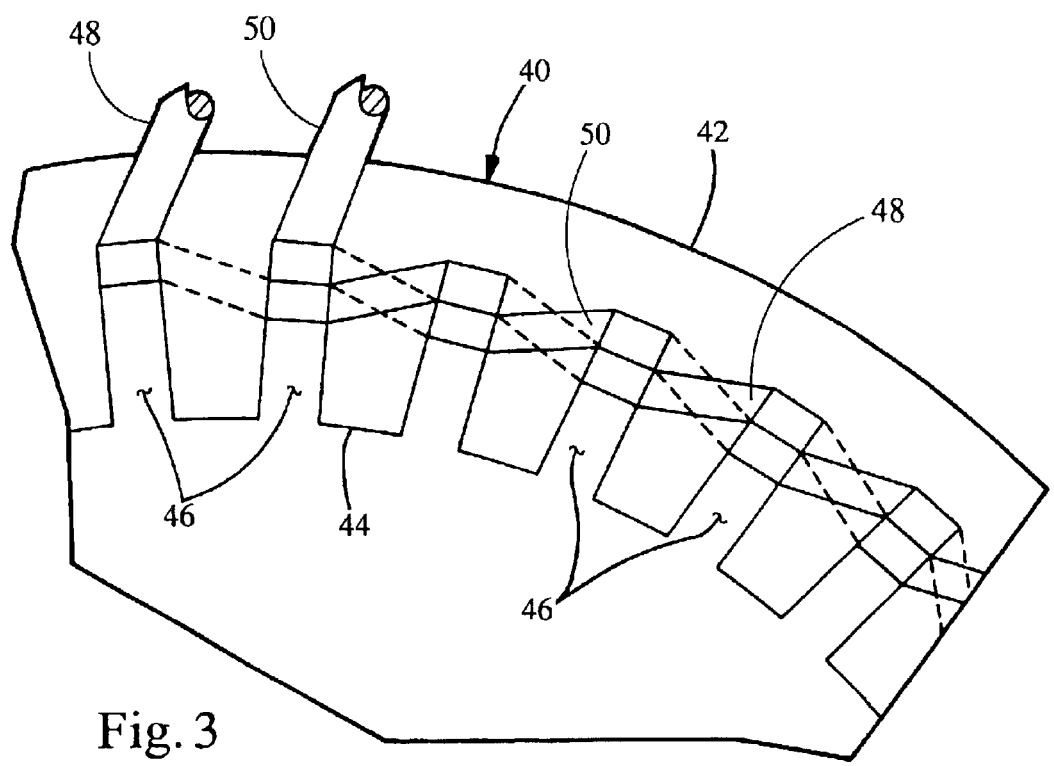
FIG. 3 is an enlarged view of a portion of the stator core shown with a pair of conductors interlaced therein.
Figure 4:
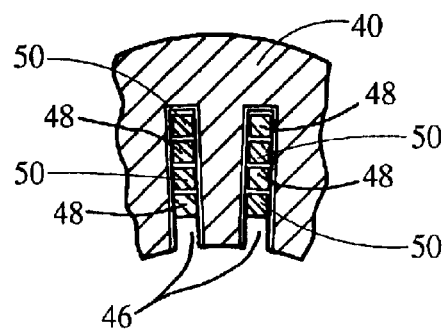
FIG. 4 illustrates how the windings fit closely within the slot.
Figure 5:
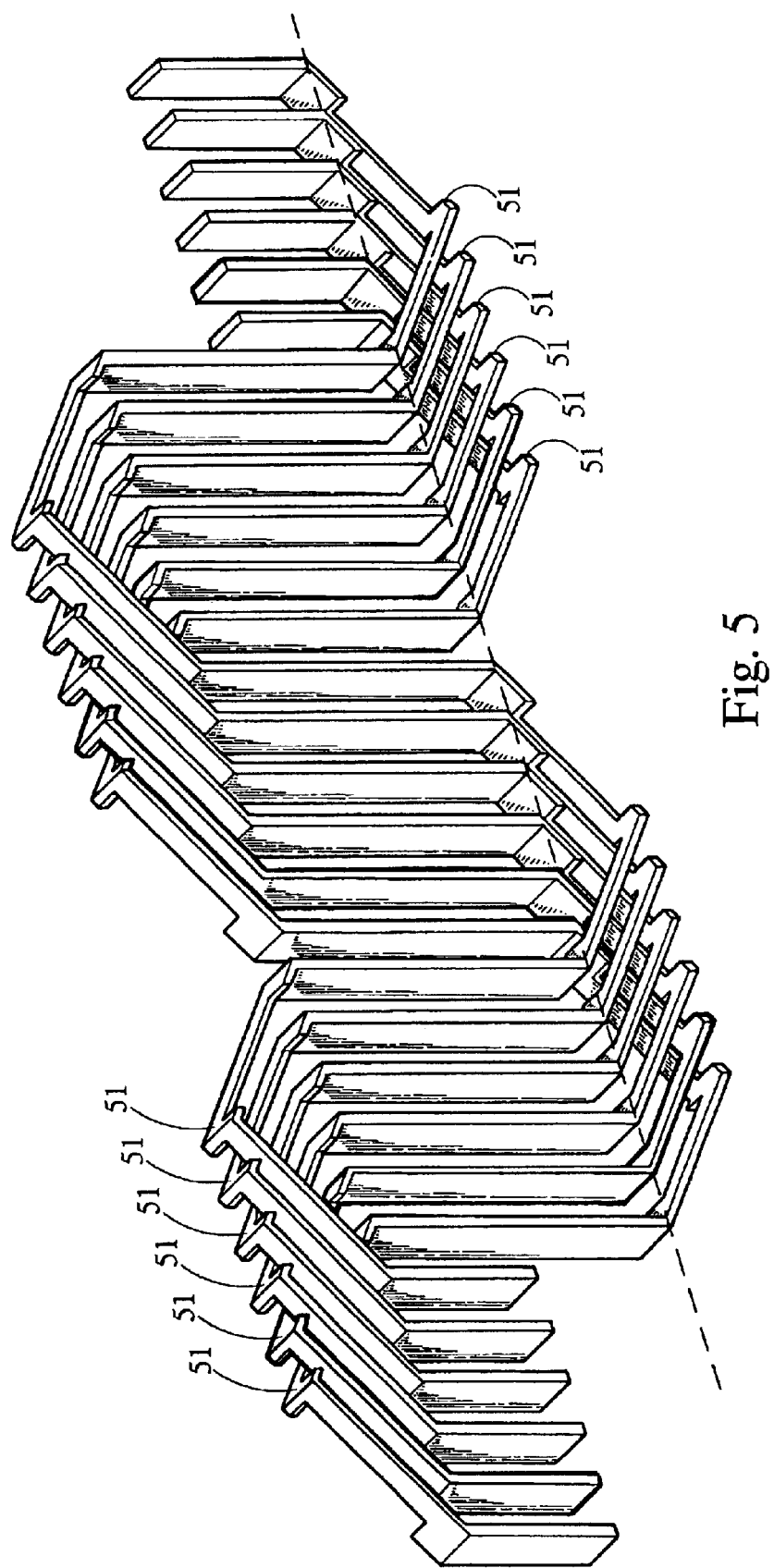
FIG. 5 is a perspective view of cascaded conductors.
Figure 18:
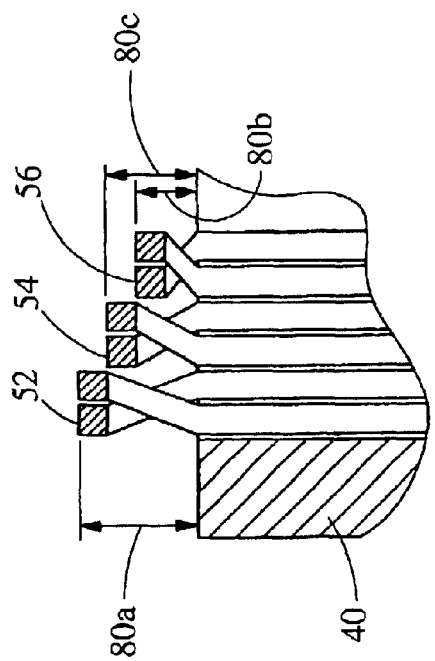
FIG. 18 is a perspective view of the stator core assembly of the third preferred embodiment.

Referring to FIGS. 3 and 4, a first continuous rectangular electrical conductor is designated as A conductor 48 and a second continuous rectangular electrical conductor is designated as B conductor 50. The A and B conductors 48, 50 are interleaved within the winding slots 46 circumferentially around the stator core 40. Reference to rectangular is, of course, intended to include square cross sectional shapes. Preferably, the width of the conductors 48, 50, including any insulation on the conductors 48, 50 is such that the conductors 48, 50 fit closely within the winding slots 46, including any insulation within the slots 46. These conductors 48, 50 are loaded into the winding slots 46 in a densely packed configuration, with adjacent winding turns overlaid on one another in the radial direction. Although two conductors are described, it should be understood, that one or more conductors could be positioned within predetermined winding slots 46 circumferentially around the stator core. In addition, these conductors could also be inserted within winding slots 46 without being interleaved, as an alternative, they may be cascaded within winding slots 46. Conductors cascaded in this manner are shown at 51 in FIG. 18. Cascading the conductors consists of connecting two straight portions of a conductor in the same radial position within in the winding slots 46 with an end loop portion, as shown in FIG. 18. Since the conductors 51 are cascaded, they can be formed such that the conductors 51 are radially aligned in the end loop areas as shown in FIG. 5.

The winding pattern of the A and B conductors 48, 50 is discussed in more detail in U.S. patent application Ser. No. 10/056,890 filed on Jan. 24, 2002, entitled "Automobile Alternator Stator Assembly With Rectangular Continuous Wire", and Continuation In Part application Ser. No. 10/265,529, filed on Oct. 8, 2002, entitled "Automobile Alternator Stator Assembly With Rectangular Continuous Wire", which are assigned to the assignee of the present application and are hereby incorporated by reference into the present application.

Figure 6:
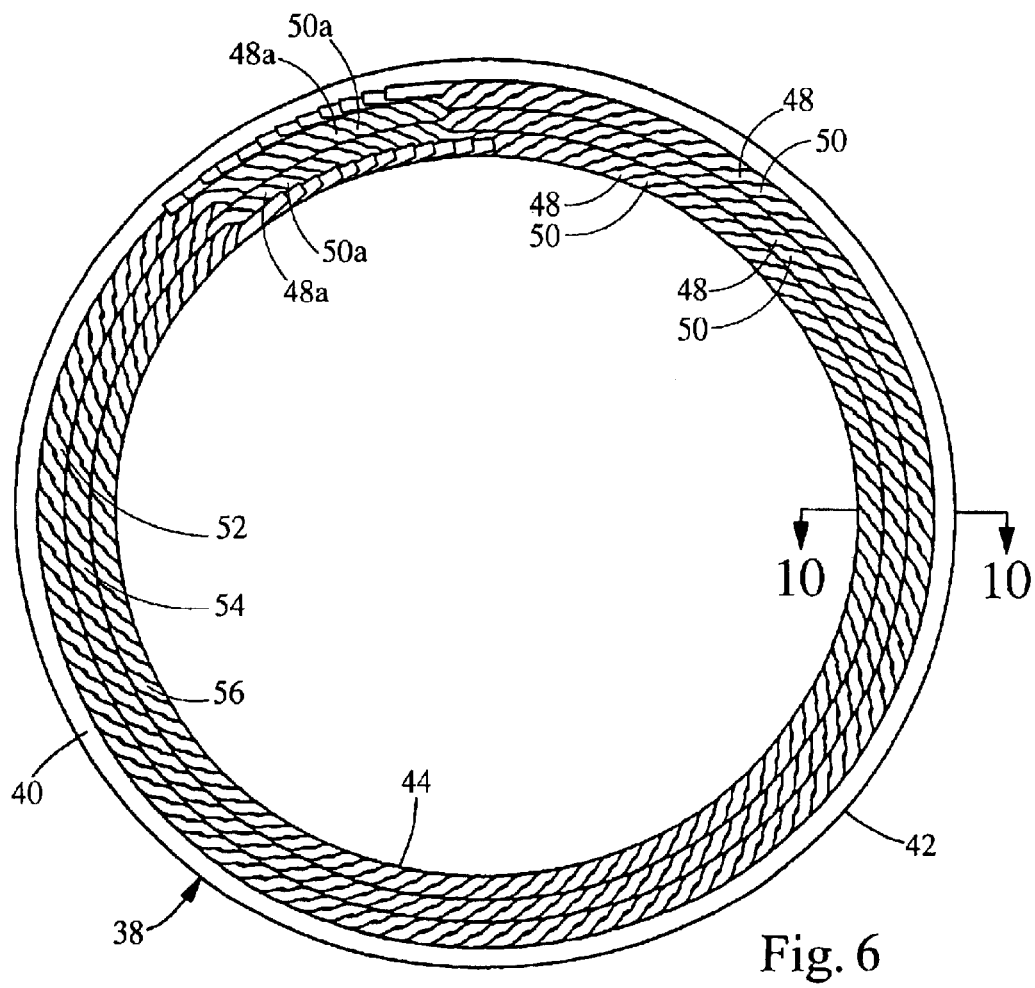
FIG. 6 is a top view of a stator core assembly of the present invention.

Referring to FIG. 6, the stator core 40 includes a plurality of layers, N. Each layer is defined by one complete circumferential pass of the A and B conductors 48, 50 of each phase, around the stator core 40. For descriptive purposes, the embodiments herein will be described as having three layers, 52, 54, 56, each having two conductors per phase, however, it is to be understood, that a stator assembly of the present invention can have any number of layers and any number of conductors per phase. Each phase is comprised of one set of continuous A and B conductors 48, 50 that pass through each layer. Since the continuous conductors pass from one layer to the next layer, there exist transitional end loops 48a, 50a, that bridge adjacent layers and connect a straight portion of one layer to a straight portion of an inward layer as shown in FIG. 6.

Figure 7:
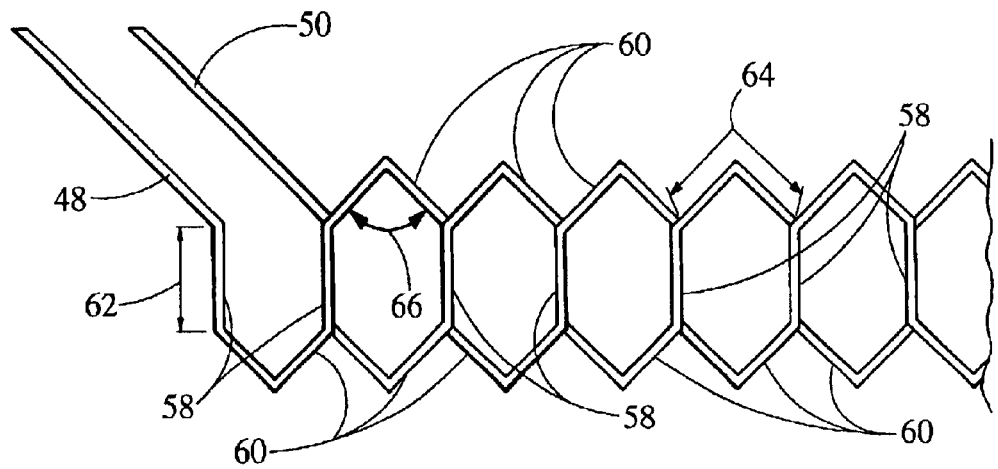
FIG. 7 is side view of the A and B conductors of a single layer of the stator core assembly shown removed from the stator core assembly.
Figure 8:
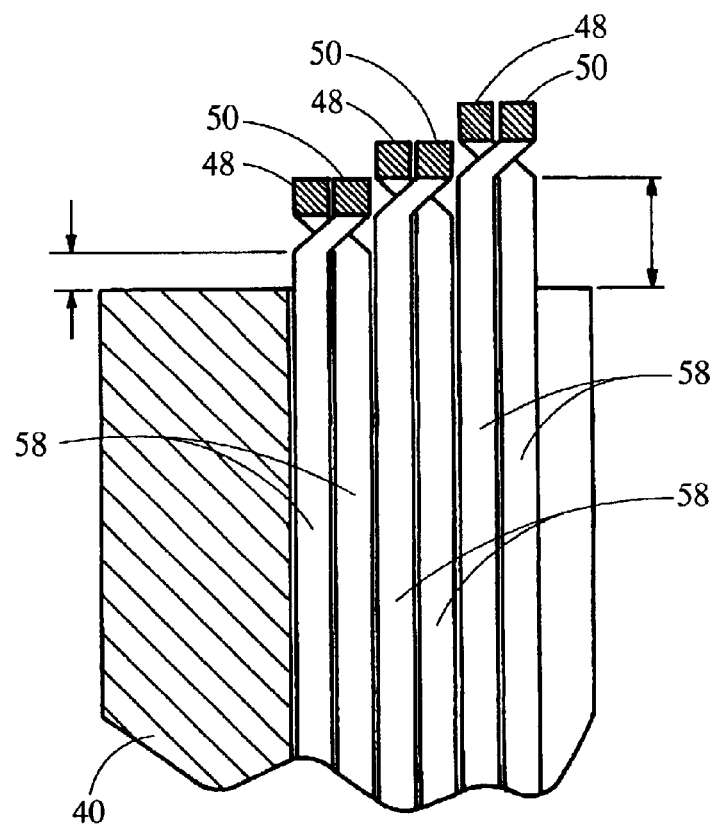
FIG. 8 is a side sectional view wherein the length of the straight portions varies between layers.

Referring to FIG. 7, the A and B conductors 48, 50, of one phase of one layer, removed from the stator core, are shown. Each of the A and B conductors 48, 50 include a plurality of straight portions 58 that lay within the radially projecting winding slots 46, and a plurality of end loop portions 60 that extend circumferentially to connect two adjacent straight portions 58. A length 62 of the straight portions 58 is preferably constant for all of the layers, as the axial length of the winding slots 46 within the stator core 40 is constant. However, a length 64 of the end loop portions 60 may be different between the layers. The length 64 of the end loop portions 60 is determined based upon the radial location of the particular layer within the stator core 40 and a pre-determined axial height of the end loop portions 60 for that layer. Although the straight portions 58 have been described as being the same axial length as winding slots 46, it should be understood that these lengths could be different from the axial length of winding slots 46. In fact, the axial length of the straight portions could vary according to the layer in which it is located. Varying the length of straight portions 58 would allow control over the axial heights of end loop portions 60, as shown in FIG. 8.

Figure 9:
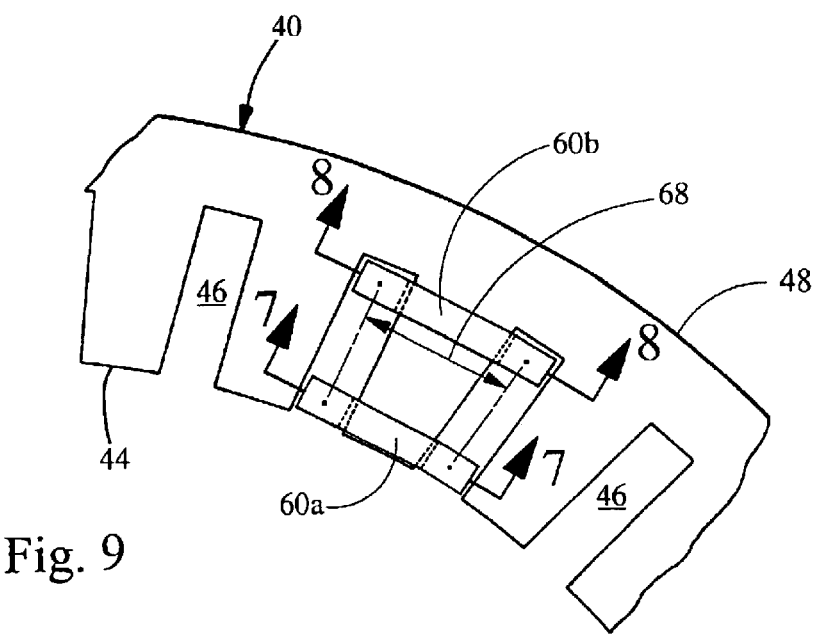
FIG. 9 is a partial top view of the stator core assembly illustrating the circumferential distance between two adjacent straight sections at two different radial positions.
Figure 10:
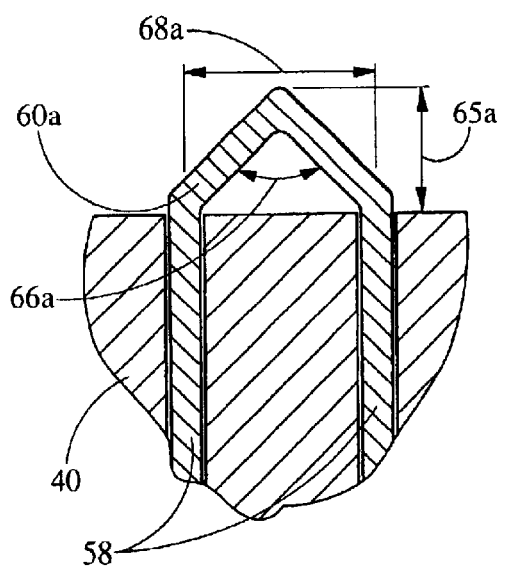
FIG. 10 is a side sectional view taken along line 7—7 of FIG. 6.
Figure 11:
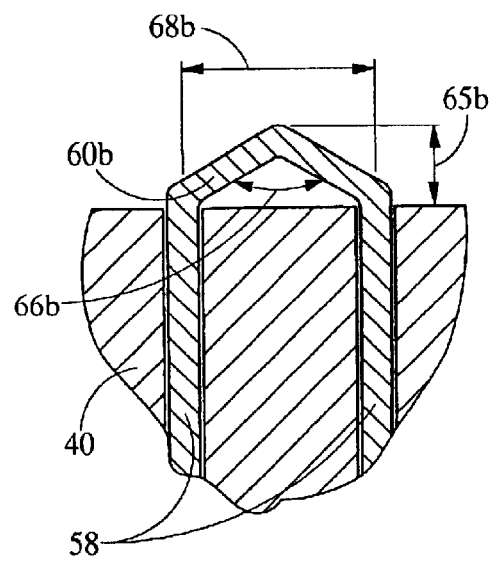
FIG. 11 is a side sectional view taken along line 8—8 of FIG. 6.
Figure 12:
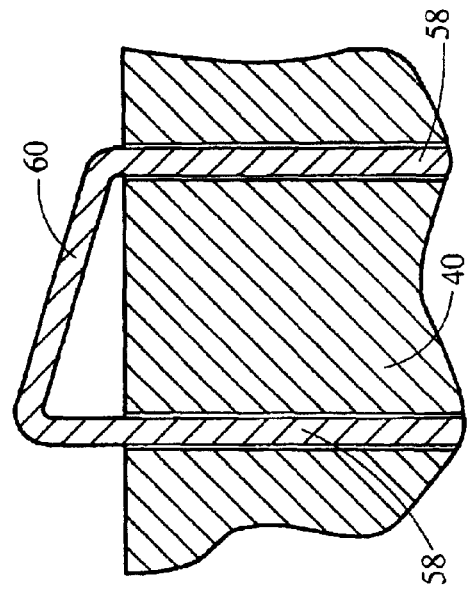
FIG. 12 is a view similar to FIGS. 10 and 11 wherein the end loop portion has an alternative shape.

Referring to FIGS. 9, 10 and 11, preferably the end loop portions 60 of the A and B conductors 48, 50 have a hairpin bend that defines an included angle 66. The stator core 40 defines a circumferential distance 68 between the winding slots 46. The circumferential distance 68 between winding slots 46 varies between radial positions, becoming shorter moving from the outer most layer to the inner most layer. Referring to FIGS. 9 and 10, an end loop 60a within an inner layer crosses a first circumferential distance 68a, resulting in the hairpin bend being spread open to a first included angle 66a such that the end loop has a first axial height 65a. Referring to FIGS. 9 and 10, an end loop 60b within an outer layer crosses a second circumferential distance 68b, greater than the first circumferential distance 68a, resulting in the hairpin bend being spread open to a second included angle 66b, greater than the first included angle 66a, such that the end loop 60b has a second axial height 65b and shape that is shorter than the first axial height 65a. An alternative end loop shape is shown in FIG. 12. It should be understood, that a wide variety of end loop shapes could be employed to facilitate different end loop axial heights.

Figure 13:
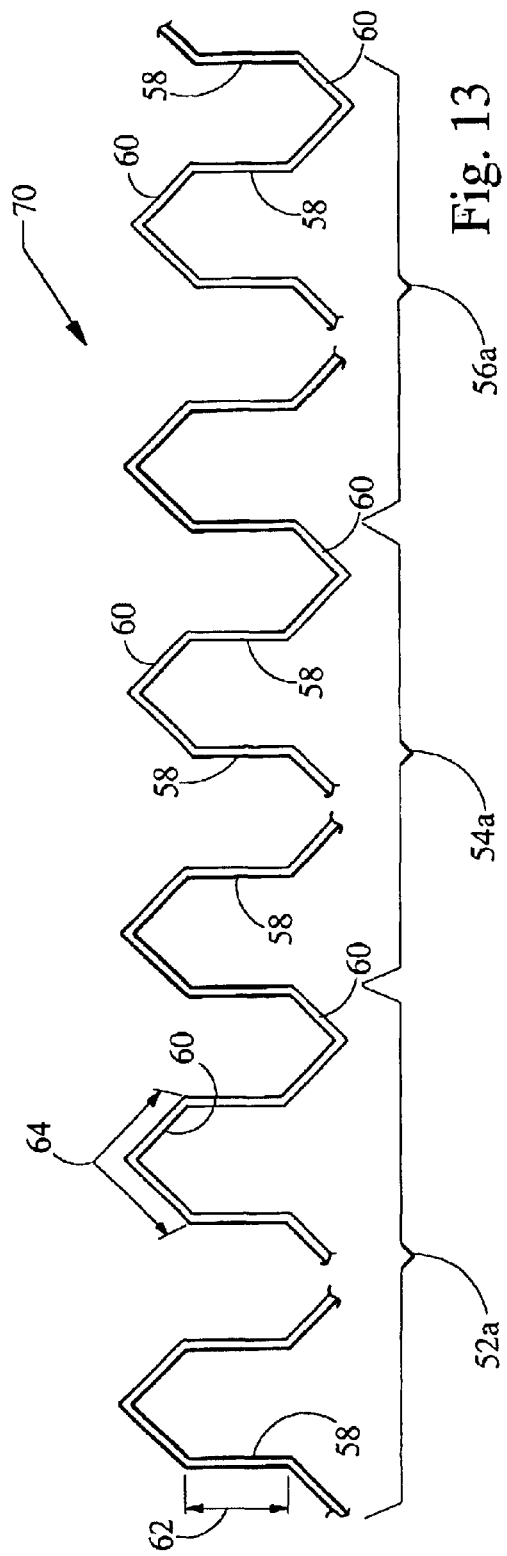
FIG. 13 is a side view of a conductor having a pre-formed shape for a three layer stator core assembly of a first preferred embodiment.

Referring to FIG. 13, a conductor prior to being interleaved within the stator core is shown generally at 70. The conductor 70 includes three discrete sections 52a, 54a, 56a, each section having the same number of straight sections 58 as the number of winding slots 46 within the stator core 40, divided by the number of phases. Each section 52a, 54a, 56a, defines one complete pass around the stator core 40, and thus one layer.

Figure 14:
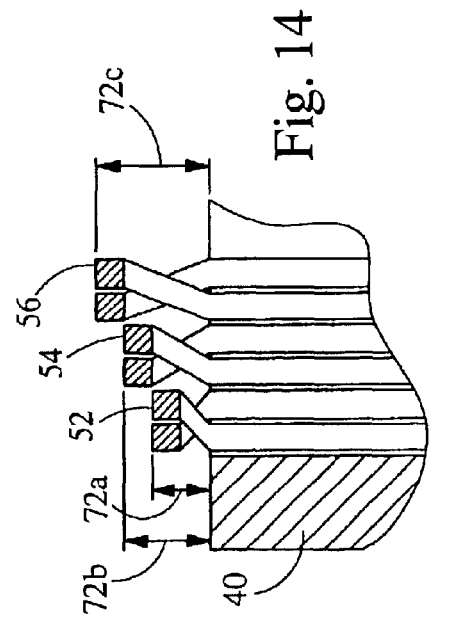
FIG. 14 is a perspective view of the stator core assembly of the first preferred embodiment.

In a first preferred embodiment, the length 64 of the end loop portions 60 within each section 52a, 54a, 56a, of the conductor 70 are the same. When the conductor 70 is interlaced within the stator core 40, the end loops 60 of the outermost layer 52 will cross a greater circumferential distance 68 than the end loops 60 of the adjacent middle layer 54, such that a resulting axial height 72a of the end loop portions 60 of the outermost layer 52 will be shorter than a resulting axial height 72b of the end loop portions 60 of the adjacent middle layer 54. Likewise, the end loops 60 of the middle layer 54 will cross a greater circumferential distance 68 than the end loops 60 of the adjacent inner layer 56, such that a resulting axial height 72b of the end loop portions 60 of the middle layer 54 will be shorter than a resulting axial height 72c of the end loop portions 60 of the adjacent inner layer 56. The result is a stator core assembly 38 having layers 52, 54, 56, with end loops heights that increase from the outermost layer to the innermost layer, as shown in FIG. 14.

The advantages of the first preferred embodiment are the ease of manufacturability of the conductors 48, 50. The conductors 48, 50 are fashioned into the pre-formed shape shown in FIG. 9 prior to being interleaved into the stator core 40, and the pre-formed conductor 70 of the first preferred embodiment has the same end loop length 64 throughout, which makes the manufacture of the pre-formed conductor 70 more simplified.

Figure 15:
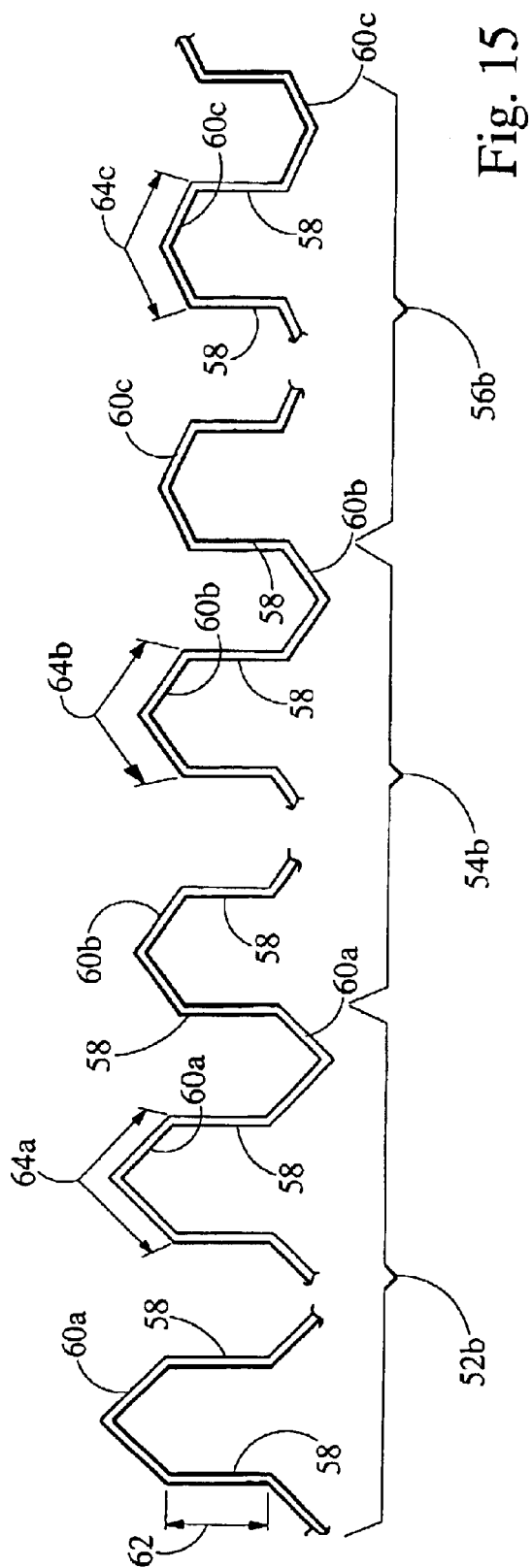
FIG. 15 is side view of a conductor having a pre-formed shape for a three layer stator core assembly of a second preferred embodiment.

Referring to FIG. 15, a conductor prior to being interleaved within the stator core is shown generally at 74. The conductor 74 includes three discrete sections 52a, 54a, 56a, each section having the same number of straight sections 58 as the number of winding slots 46 within the stator core 40, divided by the number of phases. Each section 52a, 54a, 56a, defines one complete pass around the stator core 40, and thus one layer.

Figure 16:
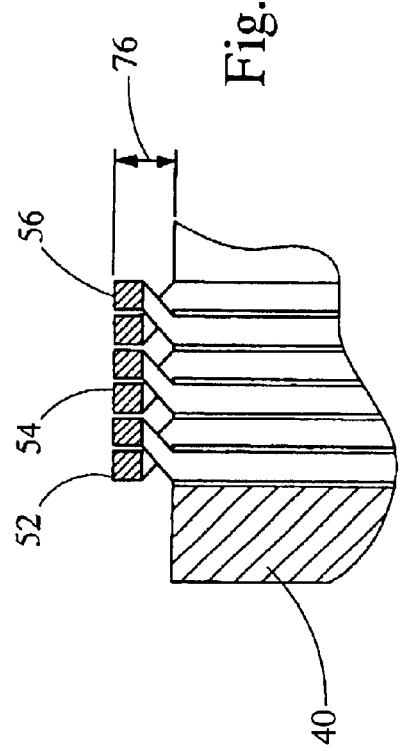
FIG. 16 is a perspective view of the stator core assembly of the second preferred embodiment.

In the second preferred embodiment, the end loop lengths 64a, 64b, 64c are different between the discrete sections 52b, 54b, 56b, of the conductor 74, as shown in FIG. 15. When the conductor 74 is interlaced within the stator core 40, the end loops 60a of the outermost layer 52 will cross a greater circumferential distance 68 than the end loops 60b of the adjacent middle layer 54. However, the length 64a of the end loop portions 60a of the outermost layer 52 are greater than the length 64b of the end loop portions 60b of the adjacent middle layer 54, such that a resulting axial height 76 of the end loop portions 60a of the outermost layer 52 will be approximately the same as the resulting axial height 76 of the end loop portions 60b of the adjacent middle layer 54. Likewise, the end loop portions 60b of the middle layer 54 will cross a greater circumferential distance 68 than the end loop portions 60c of the adjacent inner layer 56. However, the length 64b of the end loop portions 60b of the middle layer 54 are greater than the length 64c of the end loop portions 60c of the adjacent inner layer 56 such that the resulting axial height 76 of the end loop portions 60b of the middle layer 54 will be approximately the same as the resulting axial height 76 of the end loop portions 60c of the adjacent inner layer 56. The result is a stator core assembly 38 having layers with end loops heights 76 that are approximately the same from the outermost layer 52 to the innermost layer 56, as shown in FIG. 16.

The second preferred embodiment provides other advantages. When all of the end loop axial heights 76 are the same and are set to a minimum axial height 76, then the conductor 74 resistance is minimized, thereby increasing the power density and efficiency of the device.

Figure 17:
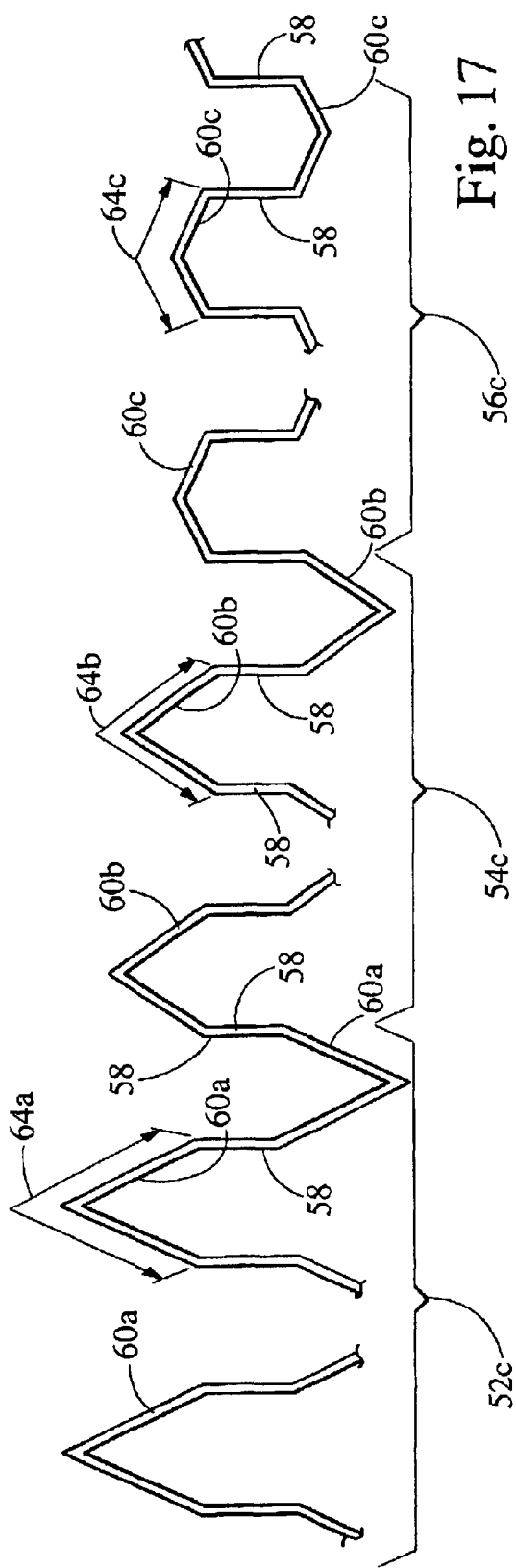
FIG. 17 is side view of a conductor having a pre-formed shape for a three layer stator core assembly of a third preferred embodiment.

Referring to FIG. 17, in a third preferred embodiment, the end loop lengths 64a, 64b, 64c are different between discrete sections 52c, 54c, 56c, of a conductor 78 similar to the second preferred embodiment. However, in the third preferred embodiment, the difference between the lengths 64a, 64b, 64c of the end loop portions 60a, 60b, 60c, is greater than the difference between the end loop lengths of the second preferred embodiment. When the conductor 78 is interlaced within the stator core 40, the end loops 60a of the outermost layer 52 will cross a greater circumferential distance 68 than the end loops 60b of the adjacent middle layer 54, however, the lengths 64a of the end loop portions 60a of the outermost layer 52 are sufficiently greater than the lengths 64b of the end loop portions 60b of the adjacent middle layer 54, that a resulting axial height 80a of the end loop portions 60a of the outermost layer 52 will be higher than a resulting axial height 80b of the end loop portions 60b of the adjacent middle layer 54.

Likewise, the end loop portions 60b of the middle layer 54 will cross a greater circumferential distance 68 than the end loops 60c of the adjacent inner layer 56, however, the lengths 64b of the end loop portions 60b of the middle layer 54 are sufficiently greater than the lengths 64c of the end loop portions 60c of the adjacent inner layer 56 that the resulting axial height 80b of the end loop portions 60b of the middle layer 54 will be higher than a resulting axial height 80c of the end loop portions 60c of the adjacent inner layer 56. The result is a stator core assembly 38 having layers 52, 54, 56, with end loops heights 80a, 80b, 80c that decrease from the outermost layer 52 to the innermost layer 56, as shown in FIG. 18. It should be understood that this effect could be reversed resulting in a stator core assembly 38 having layers 52, 54, 56, with end loops heights 80a, 80b, 80c that increase from the outermost layer 52 to the innermost layer 56, not shown.

Typically, an alternator cooling fan is located closest to the inner layers, and therefore if the layers are equal in axial height, or if the axial heights increase from the outermost layer to the innermost layer, then the inner layers will block the outer layers from receiving forced cooling air. In the third preferred embodiment, the axial height of the layers decreases from the outermost layer 52 to the innermost layer 56, thereby allowing each layer to directly receive forced cooling air.

Figure 19:
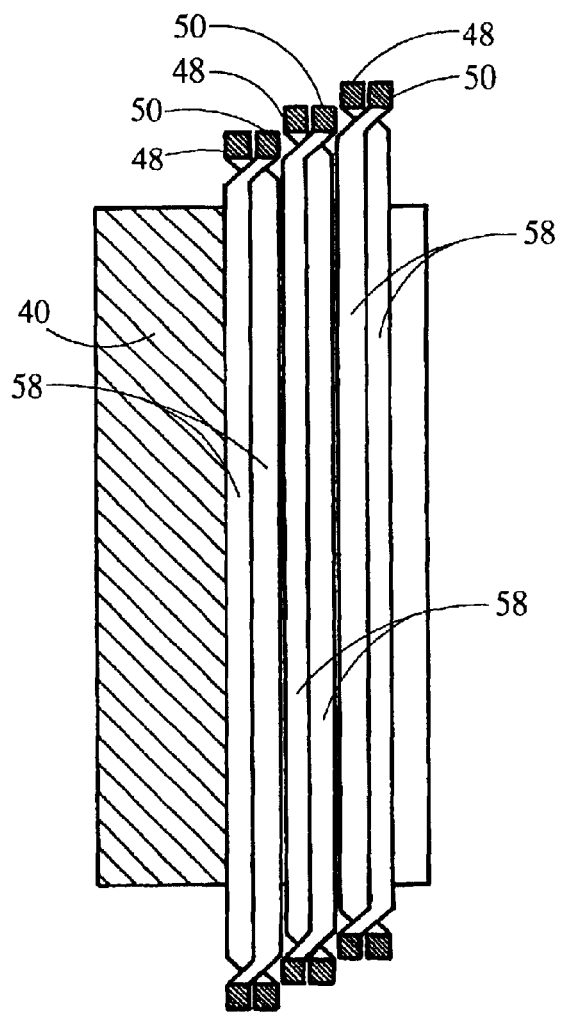
FIG. 19 is a side sectional view wherein the conductors are axial shifted relative to one another.

Referring to FIG. 19, in a fourth preferred embodiment, the conductors are axially shifted in the core 38 such that the end loop heights on one axial end of the core 38 increase from the outermost layer to the innermost layer but the end loop heights on the opposite axial end of the core 38 decrease from the outermost layer to the innermost layer.

Typically, the alternator cooling fan is located above the axial end of the core 38, so it is advantageous to increase the height of the end loops 60 such that the end loops 60 are located generously in the cooling air. The advantage of this embodiment, is that the end loops 60 increases in height for improved cooling, but the total length of the conductor remains short to minimize electrical resistance.

Figure 20:
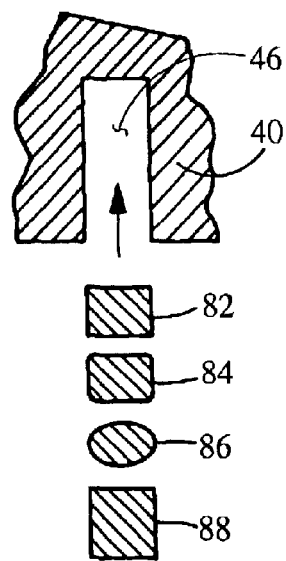
FIG. 20 illustrates alternative cross sectional shapes for the winding of this invention.

FIG. 20 illustrates alternative cross sectional shapes for the conductors 48, 50. In FIG. 20, the rectangular shape is designated by reference number 82. 84 represents a rectangular cross section with radiused corners. 86 represents an ellipse shaped cross section and 88 represents a square cross sectional shape. FIG. 4 illustrates how the conductors 48, 50 fit closely within the slots 46, aligned in one radial row.

While the above description constitutes the preferred embodiments of the present invention, it will be appreciated that the invention is susceptible to modification, variation and change without departing from the proper scope and fair meaning of the accompanying claims.

We Claim:

1. A stator core assembly for an automotive alternator of the type having a rotor assembly and a stator assembly, said stator assembly of the type having at least one phase and having an annular core defining an outside diameter, an inside diameter, and a plurality of radially projecting winding slots opening to said inside diameter but terminating short of said outside diameter, said stator core assembly comprising:

a first continuous electrical conductor;
a plurality of layers, N, each of said layers being defined by one substantially complete circumferential pass of said conductor around said stator core;
said conductor including a plurality of straight portions that lay within said predetermined radially projecting winding slots, and a plurality of end loop portions that extend circumferentially to connect two of said straight portions, wherein the length of said end loop portions varies based upon the radial location of said particular layer within said stator core and the end loop axial height varies between radial positions within said stator core based upon the radial location of a particular layer within said stator core.

2. The stator core assembly of claim 1, including two continuous electrical conductors, wherein a first conductor is designated as conductor A and a second conductor is designated as conductor B, wherein said A and B conductors are interleaved within said winding slots circumferentially around said stator core.

3. The stator core assembly of claim 2 wherein said A and B conductors are aligned in one radial row within each slot.

4. The stator core assembly of claim 1 including two continuous electrical conductors, wherein a first conductor is designated as conductor A and a second conductor is designated as conductor B, wherein said A and B conductors are cascaded within said winding slots circumferentially around said stator core.

5. The stator core assembly of claim 4 wherein said A and B conductors are aligned in one radial row within each slot.

6. The stator core assembly of claim 1 wherein said length of said end loop portions is constant for all layers such that said axial height of said end loop portions increases from an outermost layer to an innermost layer.

7. The stator core assembly of claim 1 wherein said length of said end loop portions for each layer decreases from an outermost layer to an innermost layer.

8. The stator core assembly of claim 7 wherein the decrease in said length of said end loop portions is such that said axial height of said end loop portions decreases from said outermost layer to said innermost layer.

9. The stator core assembly of claim 1 wherein said end loop portions of said conductor have a hairpin bend defining an included angle therein.

10. The stator core assembly of claim 9 wherein said stator core defines a circumferential distance between said winding slots, said circumferential distance varying between radial positions within said stator core, wherein a first circumferential distance results in said hairpin bend being spread open to a first includes, angle such that said end loop has a first axial height, and a second circumferential distance, greater than said first circumferential distance, results in said hairpin bend being spread open to a second included angle, greater than said first included angle, such that said end loop has a second axial height, shorter than said first axial height.

11. The stator core assembly of claim 1 wherein said conductor has a substantially rectangular cross-sectional shape.

12. The stator core assembly of claim 1 wherein said conductor has a substantially square cross-sectional shape.

13. The stator core assembly of claim 1 wherein said conductor has a substantially elliptical cross-sectional shape.

14. The stator core assembly of claim 1 wherein said conductor, including any insulation thereon, has a width of a dimension to be closely received by said winding slots, including any insulation on said winding slots.

15. The stator core assembly of claim 1 wherein the number of layers, N, is any whole number greater than 1.

16. A stator core assembly for an automotive alternator of the type having a rotor assembly and a stator assembly, said stator assembly of the type having at least one phase and having an annular core defining an outside diameter, an inside diameter, and a plurality of radially projecting winding slots opening to said inside diameter but terminating short of said outside diameter, said stator core assembly comprising:

a continuous electrical conductor;

a plurality of layers, N, each of said layers being defined by one substantially circumferential pass of said conductor around said stator core;

said conductor includes a plurality of straight portions that lay within said predetermined radially projecting winding slots, and a plurality of end loop portions that extend circumferentially to connect two of said straight portions, wherein the length of said straight portions varies between radial positions within said stator core based upon the radial location of a particular layer within said stator core and the end lop axial height varies between radial positions within said stator core based upon the radial location of a particular layer within said stator core.

17. A stator core assembly for an automotive alternator of the type having a rotor assembly and a stator assembly, said stator assembly of the type having at least one phase and having an annular core defining an outside diameter, an inside diameter, and a plurality of radially projecting winding slots opening to said inside diameter but terminating short of said outside diameter, said stator core assembly comprising:

a continuous electrical conductor;

a plurality of layers, N, each of said layers being defined by one substantially circumferential pass of said conductor around said stator core;

said conductor includes a plurality of straight portions that lay within said predetermined radially projecting winding slots, and a plurality of end loop portions that extend circumferentially to connect two of said straight portions, wherein the shape of said end loop portions varies such that the end loop axial height varies between layers within said stator core based upon the radial location of a particular layer within said stator core.

18. A stator core assembly for an automotive alternator of the type having a rotor assembly and a stator assembly, said stator assembly of the type having at least one phase and having an annular core defining an outside diameter, an inside diameter, and a plurality of radially projecting winding slots opening to said inside diameter but terminating short of said outside diameter, said stator core assembly comprising:

a electrical conductor;

a plurality of layers, N, each of said layers being defined by one substantially circumferential pass of said conductor around said stator core;

said conductor includes a plurality of straight portions that lay within said predetermined radially projecting winding slots, and a plurality of end loop portions that extend circumferentially to connect two of said straight portions, and wherein the length of said straight portions is different in one layer than in another layer such that the axial height of said end loop portions of said one layer is different than the end loop axial height in said another layer.

19. The stator core assembly of claim 18 wherein a length of said end loop portions is different in a layer than in another layer.

20. The stator core assembly of claim 18 wherein the shape of said end loop portions is different in a layer than in another layer.

21. The stator core assembly of claim 19 wherein said conductor is a continuous electrical conductor.

22. The stator core assembly of claim 18 further including a second conductor, wherein said first conductor and said second conductor are cascaded within said winding slots circumferentially around said stator core.

23. The stator core assembly of claim 18 wherein said length of said end loop portions is constant for all layers such that said axial height of said end loop portions increases from an outermost layer to an innermost layer.

24. The stator core assembly of claim 18 wherein said length of said end loop portions for each layer decreases from an outermost layer to an innermost layer.

25. The stator core assembly of claim 24 wherein the decrease in said length of said end loop portions is such that said axial height of said end loop portions decreases from said outermost layer to said innermost layer.

26. A stator core assembly for an automobile alternator of the type having a rotor assembly and a stator assembly, said stator assembly of the type having at least one phase and having an annular core defining an outside diameter, an inside diameter, and a plurality of radially projecting winding slots opening to said inside diameter but terminating short of said outside diameter, said stator core assembly comprising:

a first electrical conductor;

at least a second electrical conductor;

a plurality of layers, N, each of said layers being defined by one substantially complete circumferential pass of said conductors around said stator core;

said conductors including a plurality of straight portions that lay within said predetermined radially projecting winding slots, and a plurality of end loop portions that extend circumferentially to connect two of said straight portions;

wherein the axial height of said end loop portions is constant for all layers, and said layers are axially shifted relative to each other in said stator core;

wherein said first conductor and said second conductor are cascaded within said winding slots circumferentially around said stator core.

27. The stator core assembly of claim 26 wherein said end loop heights on one axial end of the core increase from an outermost layer to an innermost layer and said end loop heights on an opposite axial end of said stator core decrease from the outermost layer to the innermost layer.

* * * * *

UNITED STATES PATENT AND TRADEMARK OFFICE
CERTIFICATE OF CORRECTION

PATENT NO. : 6,787,961 B2
DATED : September 7, 2004
INVENTOR(S) : Kirk E. Neet et al.

It is certified that error appears in the above-identified patent and that said Letters Patent is hereby corrected as shown below:

Column 8,
Line 47, after "open to a first" delete "includes," and substitute -- included -- in its place.

Column 10,
Line 11, delete "claim 19" and substitute -- claim 18 -- in its place.

Signed and Sealed this

Fourteenth Day of December, 2004

JON W. DUDAS
*Director of the United States Patent and Trademark Office*